Aug. 3, 1965  K. T. KIMMLINGER ETAL  3,197,930
COMPOSITE REFRACTORY WALL
Filed Aug. 21, 1961  8 Sheets-Sheet 1

INVENTORS
KENNETH T. KIMMLINGER
AND WALKER T. MEYER
BY
ATT'YS.

Aug. 3, 1965 K. T. KIMMLINGER ETAL 3,197,930
COMPOSITE REFRACTORY WALL
Filed Aug. 21, 1961 8 Sheets-Sheet 2

INVENTORS
KENNETH T. KIMMLINGER
AND WALKER T. MEYER
ATT'YS.

Aug. 3, 1965  K. T. KIMMLINGER ETAL  3,197,930
COMPOSITE REFRACTORY WALL

Filed Aug. 21, 1961  8 Sheets-Sheet 3

INVENTORS
KENNETH T. KIMMLINGER
AND WALKER T. MEYER
BY
ATT'YS.

United States Patent Office 3,197,930
Patented Aug. 3, 1965

3,197,930
COMPOSITE REFRACTORY WALL
Kenneth T. Kimmlinger, Skokie, and Walker T. Meyer, Hazel Crest, Ill., assignors to M. H. Detrick Company, Chicago, Ill., a corporation of Delaware
Filed Aug. 21, 1961, Ser. No. 132,760
4 Claims. (Cl. 52—378)

Our invention relates to composite refractory walls, and more particularly to such walls of soaking pits.

Our invention relates to walls of industrial heating furnaces, in which the walls are relatively thick, and particularly to walls of soaking pits. The walls of such soaking pits are ordinarily quite massive because the material to be heated in them is steel in ingot form. The lining of such a heating furnace is subjected to rather sudden temperature changes because of the fact that a removable cover is provided for such a soaking pit, which is removed from time to time to place ingots in the furnace or to remove the same, the furnace lining being chilled when the covering is removed by the influx of air at atmospheric temperature. Due to the relatively heavy thickness of walls employed in soaking pits, the chilling effects are moderated somewhat by the heat stored in the walls at operating temperature.

It has been customary in the past to build the walls of soaking pits of slabs of silica stone or refractory bricks. In such walls failures occur when the inner or hot portions of the wall become disengaged from the outer or cooler portion. Various methods of tying together the wall transversely have been employed, but none have been entirely successful.

More recently, monolithic refractory materials have been applied to the walls of soaking pits. In order to tie together the inner and outer portions of such monolithic refractory walls, prefired refractory anchor members have been used, which have their longitudinal axis or length extending perpendicularly to the heat exposed surface of the wall, or in other words, transversely of the wall. Since such an anchor member extends from the heat exposed face of the wall toward the cool face through at least one-half of the thickness of the wall, an appreciable temperature gradient acts thereon. The outer end of such anchor members are ordinarily connected to the outer shell by metallic means, which is subjected to temperatures closely approaching safe use limits because of the fact that the inner end thereof is located deeply enough in the monolithic wall structure to be subjected to a considerable amount of heat.

The monolithic refractory materials ordinarily used are of two types, one of which is in the form of a concrete-like mixture, that is poured into place against wooden forms. Another is in the form of a stiff plastic and is normally prepared in the shape of slabs. The slabs are kneaded or pounded into their final desired position by pneumatic or manual hammering methods. The moisture present in these materials must be eliminated before the monolithic plastic refractory walls can be used. While some of the moisture combines with the cementing agents in the mix, the remaining moisture must be evaporated out of the monolithic refractory material before the wall can be used. The drying of such a large moist mass, particularly where the pouring method is used, is quite difficult and would require a very long period of time for the internal moisture to completely pass to the surface of the mass and into the amosphere. It has been the practice to make numerous holes in the stiff plastic mass extending perpendicularly to the exposed faces of the wall, to speed this drying process. Improper drying results in failure of the walls even before being placed into normal service.

One of the purposes of our invention is to reduce this drying problem so that it is of a manageable size, by reducing the thickness of the monolithic portion of the wall to one-half, or less than one-half, of the thickness of an all monolithic wall. This is accomplished by providing a composite refractory wall that has a core of prefired interlocked refractory members and a monolithic refractory zone extending from the core to the heat exposed face or faces of the wall.

In the use of a monolithic refractory material that has been applied in a plastic condition, by either of the methods hereinbefore referred to, after the moisture has been driven therefrom, actual fusion and vitrification occurs within the mass wherever a high enough temperature has been reached to bring about such fusion and vitrification. This is known as a ceramic bond. The temperature necessary to develop such ceramic bond does not exist through the entire thickness of an all plastic wall. The temperature that is required for producing such a ceramic bond may extend from one-half to two-thirds of the distance from the heat exposed face to the cool face of the wall, depening upon the degree of temperature at the hot or heat exposed face. Beyond the point where such temperature is reached no ceramic bond is produced and a plane of weakness exists where the ceramic bond ends.

It is a purpose of our invention to provide the monolithic refractory material only to a depth or thickness from the hot or heat exposed face of the wall toward the cool face to an extent that the inner limit of the monolithic refractory material is reached before the zone is reached in which the temperature has dropped to such an extent that no ceramic bond will be produced. Accordingly, in our improved composite wall, all of the monolithic refractory material is provided with a ceramic bond throughout, and any possibility of weakness from inadequate ceramic bonding of the plastic material is eliminated. In our composite wall construction we provide projecting portions at spaced intervals on the core of prefired refractory members, that extend to the heat exposed face of the wall, and which are provided with means for interlocking said prefired refractory members with the monolithic refractory material both in the plastic state and in the ceramically bonded state, so as to firmly anchor the monolthic zone to the core in the wall.

Our improved composite wall structure may be considered to comprise three zones, a hot inner zone of monolithic refractory material, an intermediate buffer zone of prefired refractory shapes, and a cool outer zone of insulating material where attachment of the wall to a steel shell is provided. The hot zone where wear occurs is easily repaired plastic refractory, which is provided with readily removable anchoring means in the form of refractory members that are extensions of the core structure. The structure of the intermediate zone of prefired refractories is such that the anchoring means for the hot zone monolithic refractory material can be readily attached thereto. The refractory members in the buffer zone are of such a character that they can withstand the temperatures imposed on them without spalling or deteriorating, and thus have the strength needed to maintain sound connection between the core and the outer retaining parts. Preferably the cool zone is of a castable insulating refractory or other suitable insulation.

Our invention further comprises means for anchoring the core to the metallic wall, comprising refractory anchoring members that project from the core into the insulating material of the cool zone, and are engaged by metallic brackets that are secured to the metallic wall at a point spaced from the main body portion of the core, located within the heat insulating material of the outer zone in a temperature environment that will not in any manner damage the metallic parts, even when the temperature of the outer wall portion rises due to wear producing a reduced wall thickness.

It is a further purpose of our invention to provide for the quick repair of a wall that includes monolithic refractory material which avoids the removal of any of the material in the cool zone to restore the wall to its original condition. All that is necessary when it is desired to repair the monolithic refractory material is to remove the monolithic refractory material to the face of the core and install whatever new refractory members are necessary between the core and the inner or heat exposed face of the wall to anchor the plastic material that is to be applied in the repairing operation and repair with new plastic material.

More specifically our composite refractory wall comprises an inner core of interlocked prefired refractory members that are provided with means for preventing relative movement transversely of the wall of longitudinally adjacent refractory members, which interlocked refractory members also extend from said core at spaced intervals toward the heat exposed face of the wall, and has monolithic refractory material interlocked therewith, and which core further includes projecting refractory members extending toward a metal outer wall, which are of such a character that they can be connected with metallic anchor members carried by the wall, so as to firmly anchor the entire composite wall structure to the outer metallic wall.

Other objects and advantages of our invention will appear as the description of the drawings proceeds. We desire to have it understood, however, that we do not intend to limit ourselves to the particular details shown or described, except as defined in the claims.

Figure 1:
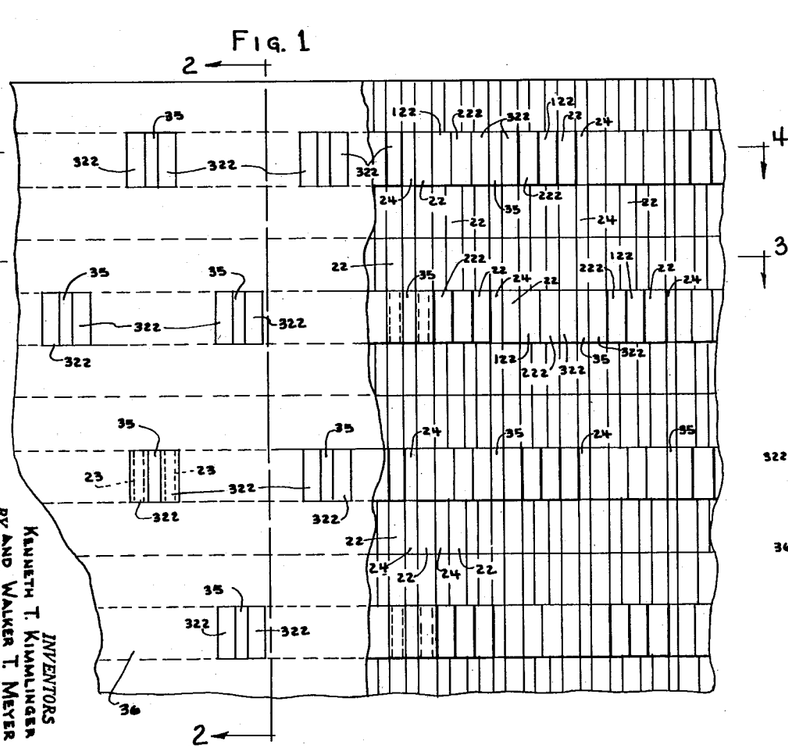
FIG. 1 is a fragmentary elevational view of our improved composite wall as seen from the inner or heat exposed face thereof, a portion of the monolithic refractory material being broken away.
Figure 2:
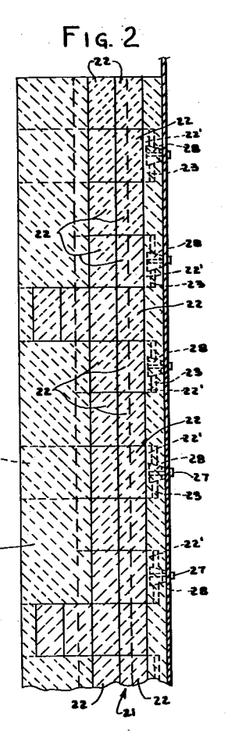
FIG. 2 is a fragmentary sectional view of said wall, taken on the line 2—2 of FIG. 1.
Figure 3:
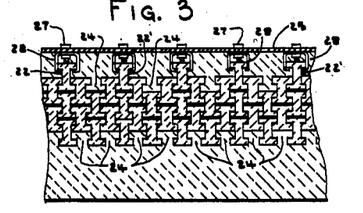
FIG. 3 is a section taken on the line 3—3 of FIG. 1.
Figure 4:
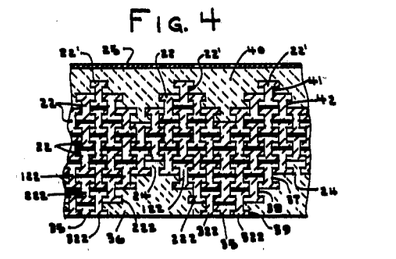
FIG. 4 is a section taken on the line 4—4 of FIG. 1.
Figure 5:
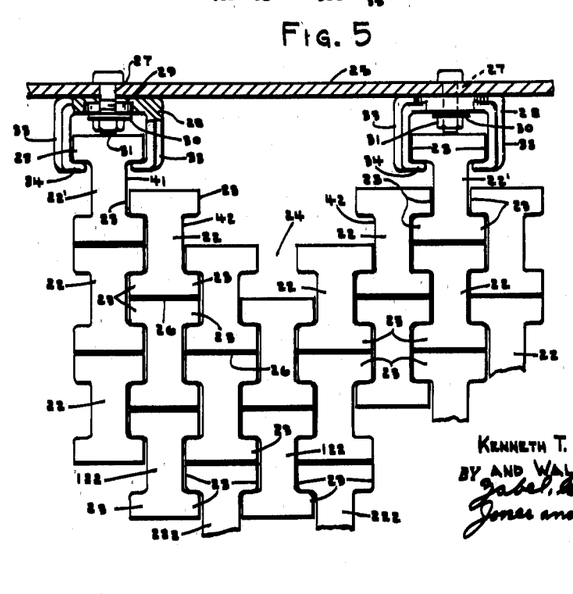
FIG. 5 is a fragmentary detail view partly in plan and partly in section, on an enlarged scale, of the core of prefired refractories, showing the means for securing the same to the metal wall.

Referring in detail to the drawings, in FIGS. 1 to 5 inclusive, is shown in composite wall structure, which is provided with a core 21 of prefired refractory members 22, which are preferably made substantially as shown in FIG. 5, with flanges or marginal ribs 23 at opposite ends thereof, said refractory members 22 interengaging as shown in FIGS. 3, 4 and 5. The main body portion of said core is made up of a plurality of transverse longitudinally adjacent rows of said refractory members 22, the refractories in each row, as will be obvious from FIGS. 3, 4 and 5, being staggered with respect to the refractories in the next adjacent row longitudinally of the wall, the narrow portion of each of the refractory members 22 being of such length that a pair of the ribs or flanges 23 of refractory members 22 of the next longitudinally adjacent row on each side thereof will be seated therein substantially as shown in FIG. 5. In the main body portion of the core, as will be obvious from FIGS. 3 and 5, the transverse rows of refractory members are made up of two such refractory members. Due to the character of the refractory members 22, the marginal portions of the main body portion of the core will have T-shaped recesses 24 therein, in certain of which are mounted the refractory members 22′, which are duplicates of the refractory members 22, but serve as refractory bracket members for securing the core to a metallic wall 25, as will be explained below.

The flanges or ribs 23 of the refractory members 22′ are seated in engagement with the marginal ribs or flanges 23 of the refractory members 22 on opposite sides thereof, to thus provide a connection between each of the members 22′ and the members 22 of the core so as to interlock said members 22′ with the members 22 on each side thereof against movement transversely of the wall, the interengagement of the ribs or flanges 23 of the refractory members 22 of longitudinally adjacent rows of said members 22 in the wall similarly holding the refractory members of longitudinally adjacent rows against movement transversely of the wall. The rib portions 23 of the members 22 do not fit closely between the rib portions 23 of longitudinally adjacent refractory members 22, there being sufficient space, as indicated at 26, to provide for expansion under heat of said refractory members 22 and to provide for sliding the members 22 easily in place in their position in the wall by movement thereof in a vertical direction.

Figure 6:
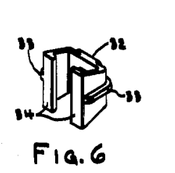
FIG. 6 is a perspective view of one of the metallic brackets for securing the core to the metallic wall.
Figure 7:
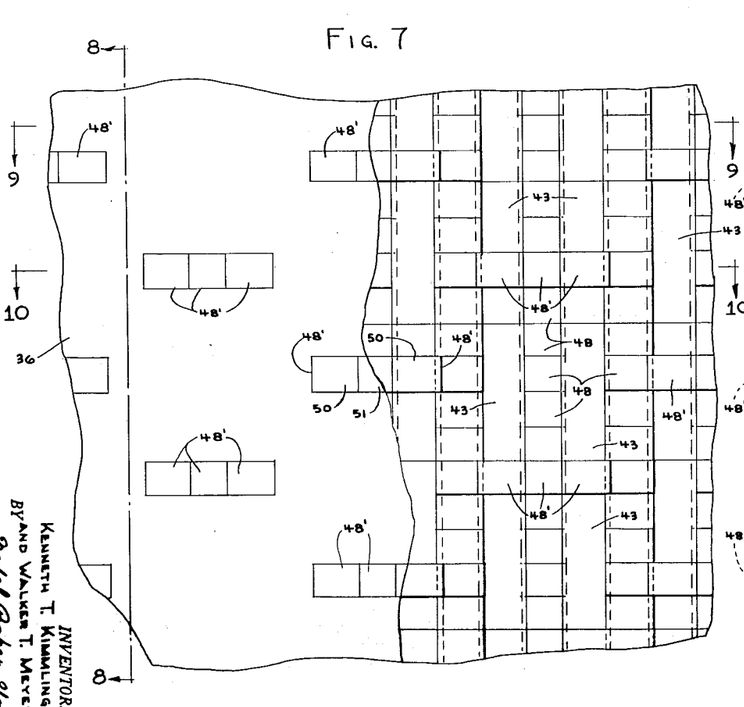
FIG. 7 is a view similar to FIG. 1 of a modification.

Secured to the metallic wall 25 by means of bolts 27 are metal brackets 28, each of which is preferably provided with a slot 29 therein, through which the bolt 27 is adapted to extend, said bolt being provided with a washer 30 and a nut 31 for clamping the bracket 28 in adjusted position on the wall 25, it being obvious that the bracket can be adjusted lengthwise of the wall 25 due to the provision of the slot 29 therein. Preferably, a wide rib 32 is provided on the bracket for seating against the metal wall 25 and a reinforcing rib 33 is provided thereon, said bracket having inwardly directed flanges 34 thereon that engage with the flanges or ribs 23 on the outer end of each of the refractory members 22′. It will be noted upon reference to FIGS. 2 and 5, that the brackets 28 and the refractory brackets 22′ are spaced uniformly both lengthwise of the wall and vertically of the wall.

The core portion of the wall is provided with projecting portions that extend to the inner heat exposed face of the wall and which are built up of the same refractory members as the body portion of the core. In order to build up these projections of the core toward the inner heat exposed face of the wall, a plurality of said refractory members having the marginal ribs or flanges are engaged in adjacent recesses 24 in the main body portion of the core, these being indicated by the numeral 122 in FIG. 4, and interlocked with said ribbed or flanged members 122 is a plurality of ribbed refractory members 222, and engaging in a similar manner to the ribbed refractory members 222 are the refractory members 322, which extend to the inner or heat exposed face of the wall. Mounted between each pair of the innermost refractory members 322 is a T-shaped refractory member 35, which is made by splitting one of the refractory members 22 in half. It will be noted that the refractory members 22, 22′, 122, 222 and 322 are all of greater vertical extent than horizontal extent and could thus be referred to as being vertically elongated.

Monolithic refractory material 36 is applied to the inner portions of the wall between the core made up of the members 22, except for extended portions thereof at their extremities and the inner heat exposed face of the composite wall. Said refractory material may be applied either in a semi-fluid state, by providing a mixture suitable for pouring into a form, or by forcing a more viscous plastic into position by pounding methods, as above referred to. The monolithic refractory material 36 will enter into all of the recesses provided at 37, 38 and 39 in the built out portions of the core so as to key the plastic refractory material at numerous points to the core, which, after drying and firing of the furnace, will result in the ceramic bonding of the mass of refractory material into a monolithic whole that is keyed to the core through the projecting portions thereof having the recesses or grooves 37, 38 and 39 therein, as well as the recesses 24. It will be noted upon reference to FIG. 1 that the projecting portions of the core that extend to the inner heat exposed face of the wall are spaced both longitudinally and vertically of the wall and that the same are arranged in rows lengthwise of the wall, and that the projecting portions of the core that extend to the heat exposed portion of the wall are staggered in longitudinally adjacent rows.

Heat insulating material 40 is provided between the outer side of the core made up of the members 22 and the outer metallic wall 25, said heat insulating material being preferably of a character that is sufficiently plastic to be poured into the space between the metallic wall 25 and the core. Due to the projecting paired members 22 and the members 22′, to which the brackets 28 are secured, there will be, in addition to the recesses 24, recesses 41 and 42, into which the insulating material 40 will flow to embed the projecting portions of the paired members to which the members 22′ are secured, and said members 22′, as well as the metallic brackets 28 in said heat insulating material. Said heat insulating material 40 is thus keyed at numerous points to the core of our composite wall structure.

Figure 9:
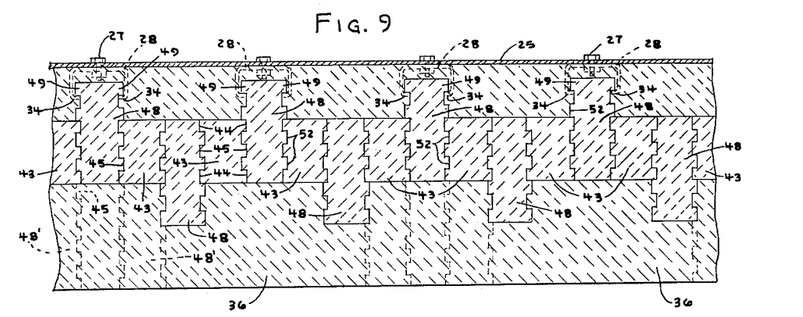
FIG. 9 is a section taken on the line 9—9 of FIG. 7.
Figure 10:
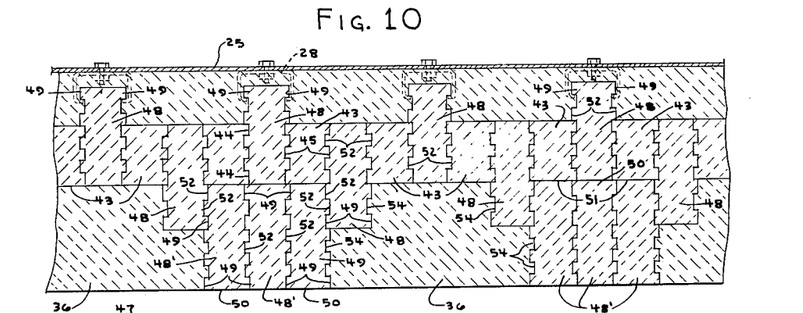
FIG. 10 is a section taken on the line 10—10 of FIG. 7.
Figure 11:
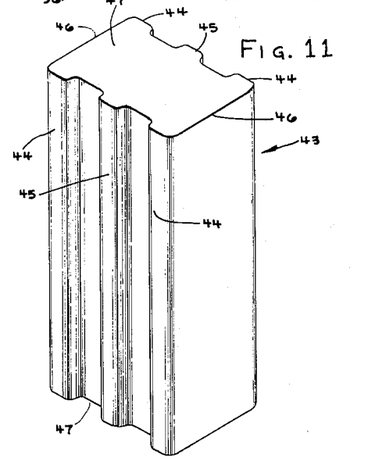
FIG. 11 is a perspective view of one of the refractory members used in the core shown in FIGS. 7 to 10, inclusive.

In FIGS. 7 to 10 inclusive, a wall having a modified core structure is shown, the core being made up of ribbed refractory members of two different lengths, including the refractory members 43, which are of a length to extend across the main body portion of the core, one of said ribbed refractory members 43 being shown in FIG. 11. Said ribbed refractory member 43 is provided with marginal ribs or flanges 44 at the inner and outer ends thereof and with an intermediate rib 45. Said refractory member 43 has flat vertical end faces 46 and flat horizontal end faces 47.

Cooperating with the refractory members 43 are the refractory members 48, which are provided with end flanges or ribs 49, and which have flat vertical end faces 50 and 51, the said refractory members 48 being provided with intermediate ribs 52 on the opposite vertical faces thereof and shallow ribs 53 on one of the horizontal faces thereof opposite shallow grooves 54 on the other of the horizontal faces theref. Said refractory members 48 alternate longitudinally of the core with refractory members 43, certain ones thereof projecting toward the metallic wall 25, the marginal ribs 49 thereof engaging with the metal brackets 28, the inturned flanges 34 of said metal brackets engaging with said ribs 49 to secure the members 48 to the metallic wall 25. As the ribs 52 on the refractory members 48 interengage with the ribs 44 and 45 of the refractory members 43, said refractory members 43 are held from movement transversely of the wall in the core.

Figure 8:
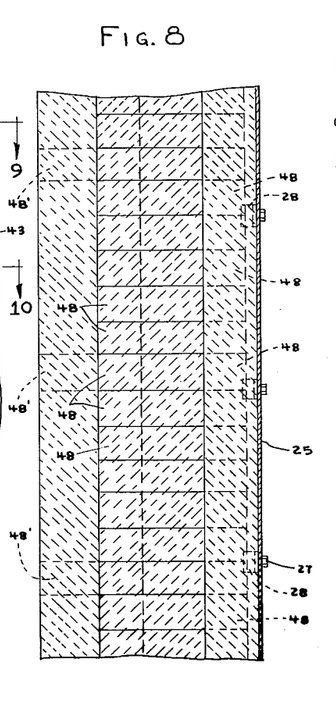
FIG. 8 is a section taken on the line 8—8 of FIG. 7.

The refractory members 48 are preferably arranged in pairs, as will be obvious from FIG. 8, on each bracket 28, the upper member of the pair engaging with a refractory member 43 extending upwardly therefrom and the lower member of the pair engaging a refractory member 43 extending downwardly therefrom.

Other refractory members 48 project beyond the ends of the refractory members 43 toward the heat exposed face of the wall, as shown in FIGS. 8, 9 and 10. The vertically extending refractory members 48 have the ribs 53 of a lower member 48 seated in the grooves 54 of the next upper refractory member 48 to thus cooperate with the ribs 44, 45, 49 and 52 to hold said members 48 against movement transversely of the wall relative to each other.

Mounted between a pair of said refractory members 48, that project toward the heated face of the wall, is a group of refractory members 48′, which are the same in character as the refractory members 48, but are designated with the reference numeral 48′ to more clearly distinguish the same from the refractory members 48. As will be obvious from FIG. 7, a single horizontal row of said members 48′ lengthwise of the wall is provided in each group and that these groups are in horizontal rows and that the groups in the horizontal rows are staggered. The members 48′ that are engaged with the adjacent members 48 have their outer ends 50 directed toward the heat exposed face of the wall, while between the same is another heat exposed refractory member 48′ that has the opposite end 51 thereof as its heat exposed face, the ribs 49 and 52 of the three refractory members 48′ interengaging as shown in FIG. 10 to thus hold the middle member 48′ from movement with respect to the outer refractory members 48′, which in turn are held from movement transversely of the wall by the cooperative action of the ribs 49 and 52 on the adjacent refractory members 48 and one of the ribs 52 on each of the refractory members 48′. Due to the difference in height of the refractory members 43 and 48, a plurality of the refractory members 48 has to be arranged in alternating relation to each refractory member 43.

The monolithic refractory material 36 is provided between the core and the inner heat exposed face of the wall in the same manner as previously described, and heat insulating material 40, such as previously described, is provided between the core and the outer metallic wall 25. The monolithic refractory material 36 will be keyed to the core of refractory members 43 and 48 by engagement in the grooves 54 of the refractory members 48 and 48′ that project into said body of monolithic material 36.

Figure 12:
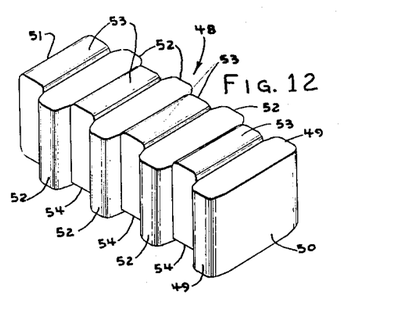
FIG. 12 is a perspective view of a modified form of refractory adapted to be used in a core similar to that shown in FIGS. 7 to 10, inclusive.
Figure 13:
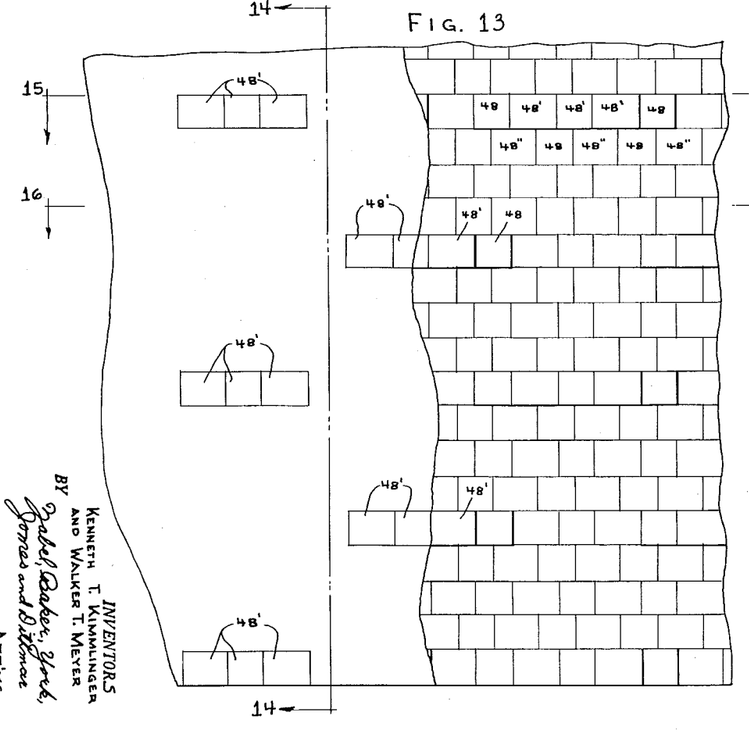
FIG. 13 is a view similar to FIG. 1 of a further modification.
Figure 14:
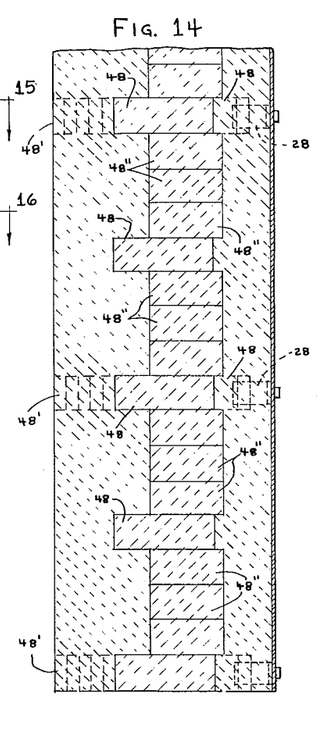
FIG. 14 is a section taken on the line 14—14 of FIG. 13.
Figure 15:
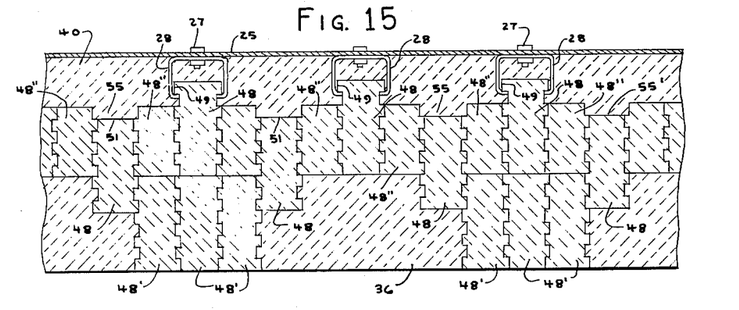
FIG. 15 is a section taken on the line 15—15 of FIG. 13.
Figure 16:
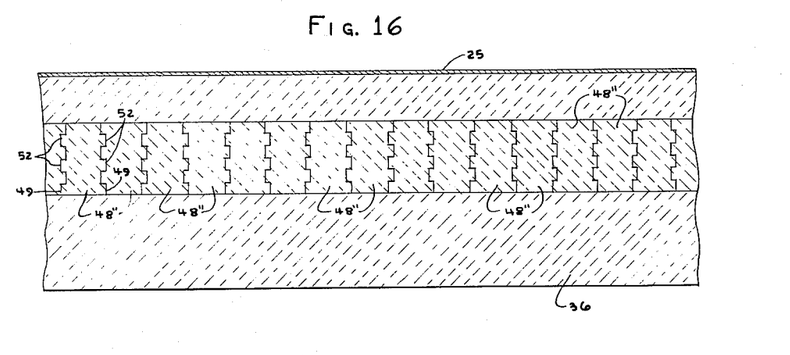
FIG. 16 is a section taken on the line 16—16 of FIG. 13.
Figure 17:
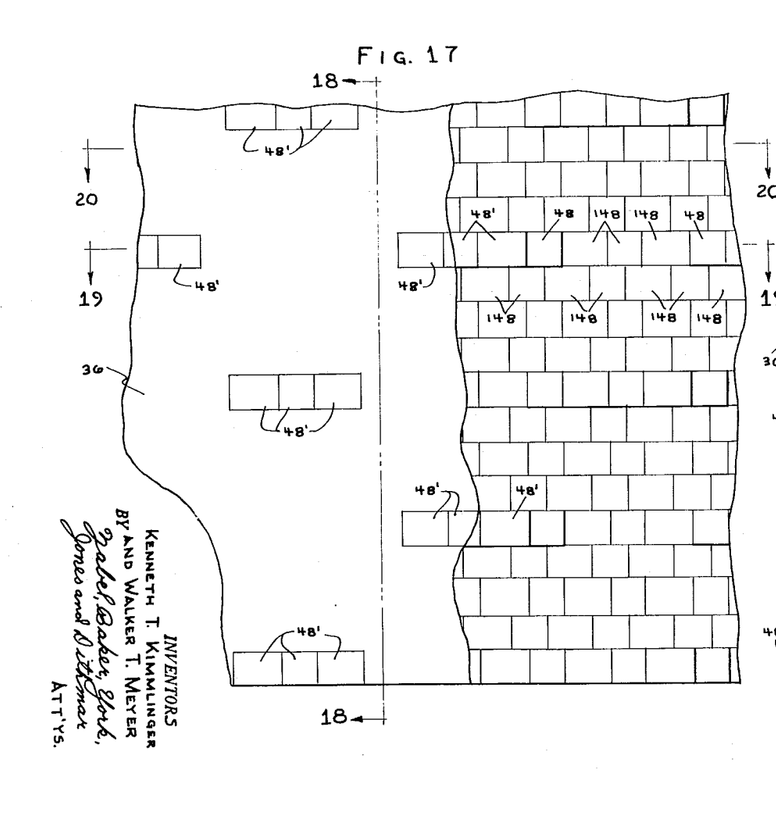
FIG. 17 is a view similar to FIG. 1 of a further modification, particularly adapted for use in partition walls of soaking pits.
Figure 18:
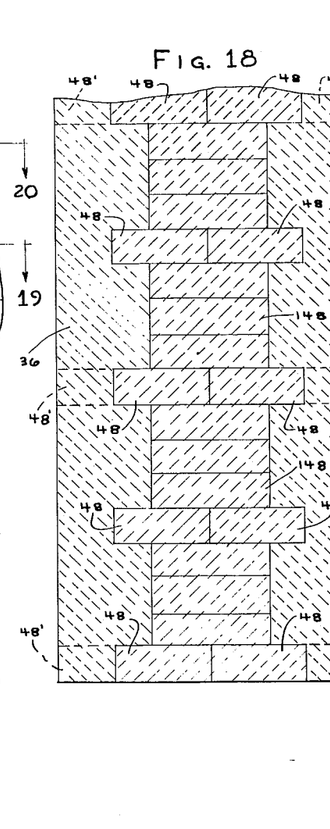
FIG. 18 is a section taken on the line 18—18 of FIG. 17.

Referring to FIGS. 13 to 16 inclusive, a further modified form of the invention is shown, that can be applied to a thinner refractory wall than that shown in the previously described forms of the invention. The core portion of the refractory wall shown in FIGS. 13 to 16 inclusive, is made up entirely of refractory members that are of the general character of the refractory member shown in FIG. 12, the refractory members utilized being of two different lengths. Those that are located in the wall in a similar manner to the ones in the forms of the invention shown in FIGS. 7 to 12 inclusive, are designated by the numerals 48 and 48′ and are made exactly as shown in FIG. 12. Shorter refractory members 48″ are also provided in the core of the wall, the refractory members 48 projecting beyond the refractory members 48″ on one side of the core toward the metallic wall 25 and being secured to the brackets 28 in the same manner as the previously described members 48 were secured to the brackets 28 as in the forms shown in FIGS. 7 to 12. The major portion of the core of the wall shown in FIGS. 13 to 16 is made up of the members 48″, as will be obvious from FIGS. 14 and 16. However, at the intervals at which the metal brackets 28 are provided, the refractory members 48″, 48 and 48′ are arranged as shown in FIGS. 13, 14 and 15.

The refractory members 48 that project toward the heat exposed face of the wall are engaged with the refractory members 48″ in the manner shown in FIG. 15, and the members 48′ that project to the heat exposed face of the wall interengage with the refractory members 48 in the same manner as the refractory members 48′ engage with the refractory members 48 in the form of the invention shown in FIGS. 8 to 12, inclusive. However, instead of providing refractory members 43, the refractory members 48″ are provided in the major portion of the wall and alternate with the members 48 in the horizontal planes in which the horizontal brackets 28 are located in the manner shown in FIG. 15. It will be obvious that all of the refractory members are held from relative movement transversely of the wall due to the engagement of the ribs 53 with the grooves 54 and of the ribs 52 and 49 with each other, the refractory members 48″ being made in the same manner as the refractory members 48, except that, instead of having three ribs 52 spaced from the ends thereof, only two such ribs 52 are provided on each of said members on each side thereof together with the marginal ribs 49. Upon reference to FIG. 15, it will be noted that the heat insulating material 40, which is of the same nature as previously described, extends into recesses 55 that exist between the end walls 51 of the members 48 that project at their other ends toward the heat exposed face of the wall. Such recesses will help to key the heat insulating material 40 to the core of the wall. The monolithic refractory material 36 is of the same character as in the previously described forms of the invention and will be keyed to the core structure in a similar manner to that described in connection with the core structure shown in FIGS. 7 to 10 inclusive.

In FIGS. 17 to 20 inclusive, our invention is shown as being applied to a wall that has both faces thereof exposed to the heat, such as a partition wall in a soaking pit. The core structure in the wall shown in FIGS. 17 to 20 inclusive, is made up of refractory members of a similar character to that shown in FIG. 12, the main body portion of the core being made up of refractories 148, which are similar to the refractories 48 shown in FIG. 12, except for the fact that they are of greater length and have four ribs 52 that are spaced from the ends thereof, additional to the marginal ribs 49.

Figure 19:
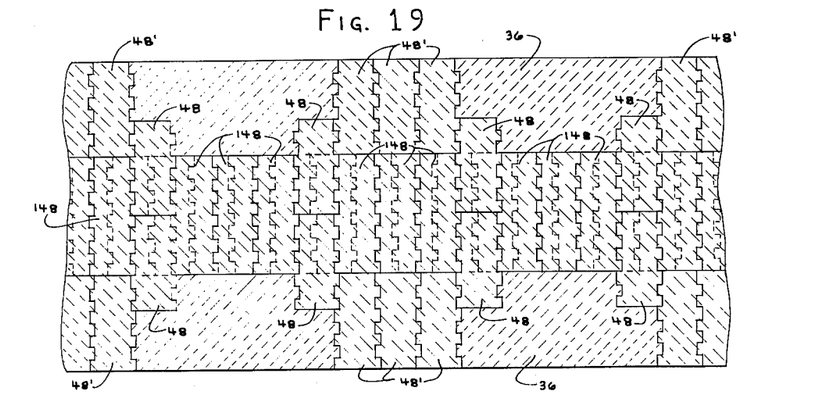
FIG. 19 is a section taken on the line 19—19 of FIG. 17.
Figure 20:
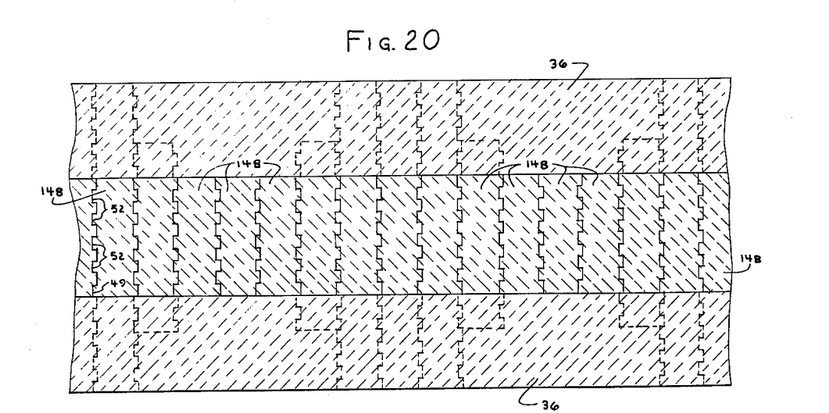
FIG. 20 is a section taken on the line 20—20 of FIG. 17.

The refractory members 48′, which project to the opposite heat exposed faces of the wall shown in FIGS. 17 to 20, are arranged in groups as for the heat exposed face of the wall in the form of the invention shown in FIGS. 13 to 16 inclusive, the refractory members 48′ being of the same character as the refractory members 48 shown in FIG. 12 and being held in position by means of refractories 48, which have the ribs thereof interengaging with the ribs of the refractory members 148 as shown in FIG. 19. The refractory members 148 are thus fixed against relative movement with respect to each other transversely of the wall, as are the refractory members 48, and the refractory members 48′ are similarly held from movement transversely of the wall with respect to each other and to the members 148 by means of the refractory members 48. The monolithic refractory material 36 is provided on both faces of the wall, being put in position therein in a similar manner to that previously described, and being keyed to the portions of the refractory members 48 that project beyond the members 148 and to the members 48′ by entering the recesses between the projections on said members 48 and 48′ in the manner previously described. The portions of the wall that are made up of prefired refractory members that extend to the heat exposed face of the wall are thus made up of rows of refractory members 48′ and 148 that are arranged transversely of the wall with the ends of the rows at the heat exposed faces thereof.

In all of the forms of the invention described herein, the core of prefired refractory members comprises a main body portion of said prefired members that are interlocked against relative movement transversely of the wall and stepped tapering portions projecting laterally from said main body portion into the monolithic refractory zone, said stepped tapering portions being interlocked with the monolithic refractory material of said monolithic zone against relative movement transversely of the wall and interlocked relative to each other and to the refractory members of the main body portion of the core against such relative movement transversely of the wall. Furthermore, said projections comprise groups of refractory members that include refractory members that extend to the heat exposed face of the wall and other refractory members that terminate in spaced relation to the heat exposed face that are interlocked with the refractory members that extend to said heat exposed face.

What we claim is:

1. A composite wall having an inner heat exposed face and an outer face, comprising a rigid outer metallic wall, a core of prefired refractory members mounted in spaced relation to said metallic wall, the refractory members of said core being interlocked with each other against relative movement transversely of said core, a monolithic zone of cast-in-situ refractory material extending from said core to the inner heat exposed face of said wall and a zone of heat insulating material between said core and said metallic wall, said core having a main body portion and stepped tapering portions projecting laterally inwardly from said main body portion into said monolithic refractory zone and interlocked with the monolithic refractory material of said monolithic zone against relative movement transversely of said wall, said stepped tapering portions being spaced longitudinally of said core and comprising groups of interlocked prefired refractory members interlocked with adjacent refractory members of said core against relative movement transversely of said core, said groups including prefired refractory members extending to the heat exposed face of said wall and prefired refractory members terminating in spaced relation to said heat exposed face, said prefired refractory members that terminate in spaced relation to said heat exposed face being interlocked with the refractory members that extend to said heat exposed face against relative movement transversely of said wall, said core having portions projecting outwardly from said main body portion thereof toward said metallic wall, said projecting portions comprising prefired refractory members mounted in the main body portion of said core and interlocked with adjacent refractory members of said core against movement transversely of said core, and metallic bracket members secured to said core and engaging said prefired members of the outwardly projecting portions of said core to secure said core to said metallic wall.

2. A composite wall having opposed heat exposed faces, comprising a central core of prefired refractory members, the refractory members of said core being interlocked with each other against relative movement transversely of said core and a monolithic zone of cast-in-situ refractory material extending from said core to the opposite heat exposed faces of said wall, said core having a main body portion and stepped tapering portions projecting laterally from said main body portion into said monolithic refractory zones and interlocked with the monolithic refractory material of said monolithic zones against relative movement transversely of said wall, said stepped tapering portions being spaced longitudinally of said core and comprising groups of interlocked prefired refractory members interlocked with adjacent refractory members of said core against relative movement transversely of said core, said groups including prefired refractory members extending to the heat exposed faces of said wall and prefired refractory members terminating in spaced relation to said heat exposed faces, said prefired refractory members that terminate in spaced relation to said heat exposed faces being interlocked with the refractory members that extend to said heat exposed faces against relative movement transversely of said wall.

3. The composite wall claimed in claim 1 in which the interlocked prefired refractory members of the core are elongated, ribbed transversely of their length, extend with their length transversely of said wall and are in adjacency longitudinally of said core, the ribs of said refractory members interengaging with the ribs of the refractory members longitudinally adjacent thereto to interlock said refractory members against movement relative to each other transversely of said wall.

4. The composite wall claimed in claim 2 in which the interlocked prefired refractory members of the core are elongated, ribbed transversely of their length, extend with their length transversely of said wall and are in adjacency longitudinally of said core, the ribs of said refractory members interengaging with the ribs of the refractory members longitudinally adjacent thereto to interlock said refractory members against movement relative to each other transversely of said wall.

References Cited by the Examiner
UNITED STATES PATENTS

| | | | |
|---|---|---|---|
| 1,573,188 | 2/26 | Parker | 50—378 |
| 1,800,244 | 4/31 | Blum | 50—398 |
| 2,024,595 | 12/35 | Petit | 50—417 |
| 2,225,983 | 12/40 | Doyle | 50—331 |
| 2,273,898 | 2/42 | Short | 50—420 |
| 2,446,766 | 8/48 | Hosbein et al. | 110—99 |
| 2,618,961 | 11/52 | Williamson | 50—331 |
| 2,854,842 | 10/58 | Hosbein | 50—420 |

JACOB L. NACKENOFF, *Primary Examiner.*

WILLIAM I. MUSHAKE, *Examiner.*